United States Patent [19]

Chamberlain et al.

[11] Patent Number: 4,822,620

[45] Date of Patent: Apr. 18, 1989

[54] SILAGE PRODUCTION

[75] Inventors: Peter Chamberlain, Shipley; Simon Couldwell, Batley, both of England

[73] Assignee: Allied Colloids Limited, Bradford, England

[21] Appl. No.: 27,533

[22] Filed: Mar. 18, 1987

[30] Foreign Application Priority Data

Mar. 19, 1986 [GB] United Kingdom ............... 8606805

[51] Int. Cl.$^4$ .............................................. A23K 3/02
[52] U.S. Cl. .......................................... 426/2; 426/54; 426/636; 426/807
[58] Field of Search ....................................... 426/53–54, 426/61, 626, 335, 636, 623, 630, 807, 532, 128; 524/555; 523/111

[56] References Cited

U.S. PATENT DOCUMENTS

| | | | |
|---|---|---|---|
| 3,368,901 | 2/1968 | Thompson | 426/54 |
| 3,871,949 | 3/1975 | Forest et al. | |
| 4,089,979 | 5/1978 | Jackson | 426/573 |
| 4,540,586 | 9/1985 | Moore | 426/69 |
| 4,592,915 | 6/1986 | Goyette et al. | 426/321 |
| 4,645,698 | 2/1987 | Matsubara | 426/124 |
| 4,686,776 | 8/1987 | Matsubara | 426/124 |

FOREIGN PATENT DOCUMENTS 0237267 9/1987 European Pat. Off. .
2176386A 12/1986 United Kingdom .

OTHER PUBLICATIONS

Morrison Feeds and Feeding Morrison Publishing Co., 1967, pp. 276 and 277.

*Animal Feed Science and Technology*, vol. 8, No. 2, 1983, pp. 107–118, Elsovier Scientific Publishing Co., Amsterdam NL; M. K. Woolford et al., "*Investigations on the Effect of Sodium Bentonite and Other Moisture Absorbents on the Production of Effluent from Grass Silage*".

*Primary Examiner*—R. B. Penland
*Attorney, Agent, or Firm*—Robbins & Laramie

[57] ABSTRACT

Silage effluent is retained within the silo by adding a water-absorbent, water-swellable particles of synthetic polymer with the grass, maize etc. Preferably the polymer is an acrylic acid polymer or a dimethylaminoethyl acrylate polymer. The polymer may be used in conjunction with other additives e.g. lactic-acid producing bacterial inoculants, acid compounds or sterilizing compositions.

35 Claims, No Drawings

SILAGE PRODUCTION

The present invention relates to improved methods for making silage, in particular to methods for preventing loss of nutrients in liquid effluent from silage during its production.

It is known to add substances to the matter used to make silage, generally grass and/or maize, as well as waste food, distillery by-products, fish offal, etc., for example to enhance its nutrient content. Molasses is often added for this reason.

One of the problems with making silage is that the matter within the silo may be broken down by certain bacteria to produce unpalatable silage. For example butyric acid may be produced by certain bacteria and this renders the silage unpalatable. To inhibit the growth of such bacteria it is known to encourage instead the growth of bacteria which break down the silage to form palatable products such as lactic acid. The growth of Lactobacter which produce lactic acid is encouraged by reducing the pH, for example by adding acids, or by inoculating the silage with inoculants of the bacteria which rapidly colonise the silo and produce lactic acid.

It is known also to prevent the production of butyric acid by sterilizing the silage to inhibit the growth of all bacteria. Formalin is often used as the steriliser. In GB No. 2120924 the sterilising properties of formalin are improved by adding a vapour suppressant to retain the formalin within the silage and prevent vapourisation of malodourous and toxic formaldehyde. The vapour suppressant comprises waters-soluble polymers, for example polyacrylamide or copolymers of methyl vinyl ether and maleic anhydride.

Liquid effluent is formed in the silo during the manufacture of silage and tends to drain out of the silo. The volume of effluent that drains out can, especially when the silage-making matter is introduced wet, be quite high. The effluent comprises various nutrients but, in bulk form, is unpalatable to cows. The effluent can create unpleasant grounds conditions near the silo and can pollute waterways since bacterial growth in contaminated waterways is increased, thereby deoxygenating the water, which is damaging to other aquatic life.

To retain the effluent within the silage so that its nutrients may be utilized natural water-absorbent material such as straw, clay and newspaper have been added to the silage-making matter. However to absorb the effluent the amount of such materials that must be added decreases the overall digestability of the silage so that it is more economical to allow the effluent to be lost.

In an article in Farmers Weekly of Sept. 26, 1986 (i.e. after the priority date of this application) and in marketing literature produced by IPT (International) Ltd. a water absorbent acrylic acid gel polymer is swollen with water and then used as a feed additive e.g. by spreading onto silage before feeding it to cows. It is claimed that addition of the gel polymer to preformed silage improved degradability and that cows fed 20 g dry weight polymer per day with silage had an increased growth rate. No harmful effects were detected in the cows fed with the material the rumen and other organs were normal and no acrylamide could be detected in the blood. The polymer is always preswollen before being added to the silage and is only added immediately before feeding.

GB No. 2176386, published after the priority date of this application, describes a process for producing animal feedstuffs by mixing grain with preswollen acrylic gel polymer and maintaining the mixture under conditions in which the grain germinates. The swollen gel acts as a source of water for the germinating seeds. The mat of gel and germinated grain is used directly as a feedstuff. An acrylamide polymer cross-linked with methylene bis-acrylamide was found to be quite harmless to the animals.

A method according to the invention for retaining silage effluent in silage comprises adding a water-absorbent material to the silage-making matter in a silo and is characterized in that the material comprises water-insoluble, water-swellable particles comprising synthetic polymer.

A product according to the invention comprises a mixture of silage and water-insoluble particles of polymeric material swollen by silage effluent. The polymer particles are introduced into the silo in water-swellable, substantially dry, form and are preferably added to the silo with the silage making matter. For example the dried particles may be sprinkled continuously or intermittently into the silo, or into the silage making matter during the charging of the matter into the silo. Generally at least some of the particles are added near to the base of the silo.

The incorporation of polymer into silage in this invention has the effect of retaining some or all of the liquid effluent that would otherwise drain out of the silo and have the disadvantageous results described above. The effluent that is retained in the polymer particles will contain valuable nutrients so that the nutritive value of the silage will be improved.

It might have been thought to be desirable to use a natural polymer as the absorbent, especially from the point of view of the digestability and non-toxicity of the swollen polymer particles when the silage is eaten by the cow. However we have found that natural polymers are unsatisfactory since during the manufacture and storage of the silage they tend to degrade, possibly due to the acidic conditions that often prevail or due to biodegradation. Accordingly the polymers are preferably formed wholly from synthetic monomers, generally water soluble monomers. The monomers are generally ethylenically unsaturated monomers, preferably acrylic monomers. In order that the polymer is water swellable and water insoluble, rather than water soluble, it is cross linked.

The polymer used in the present invention is substantially stable in the conditions in a silo so that it is not degraded biologically or chemically during the silage fermentation process in a manner which destroys the absorbency of the polymer. The polymer in the final silage produced should be non-toxic, that is it should be made from monomers and other components which are non-toxic, or the polymer should be entirely free of unreacted toxic monomer used for the production of the polymer and of any other toxic components used in the addition to the silo to rid it of any such components or the components should be such that they are entirely degraded during the fermentation process. Furthermore the polymer should not be capable of reacting, either in the silo or in the digestive tract of an animal feeding on the silage, to form products which are toxic, usually the polymer is substantially non-degradable in the digestive tract of the animal, although it may degrade (to form non-toxic products) to some extent in its passage through the digestive tract of the animal.

Although the polymer can be non-toxic, it is preferably ionic, for example cationic or anionic. Sometimes the polymer may have cationic and anionic groups.

Monomers from which cationic polymers can be produced include nitrogen-containing ethylenically unsaturated monomers. Preferred monomers include dialkylaminoalkyl (meth)acrylamides and -(meth)acrylates and their acid salt and quaternary derivatives, for example dimethyl aminopropyl methacrylamide quaternised with methylchloride (MAPTAC), dimethylaminoethyl acrylate and -methacrylate and diethylaminoethylacrylate and -methacrylate, and dialkyldi(meth)allyl ammonium compounds, for example dimethyldiallyl ammonium chloride.

Monomers from which anionic polymers may be produced preferably include ethylenicallyunsaturated carboxylic or sulphonic acids. The preferred monomers include (meth) acrylic acid, itaconic acid, crotonic acid and 2-acrylamido-2-methyl propane sulphonic acid; acrylic acid is preferred. Anionic monomers may be present as free acid or, preferably, as a water soluble salt, for instance with ammonium or sodium or other alkali metal.

The ionic monomer may be copolymerised with a non-ionic comonomer. The preferred non-ionic comonomer is acrylamide but others include hydroxyalkyl (meth) acrylates, for instance hydroxyethyl acrylate. Polyacrylamide has very good water-absorption characteristics and can be used.

Other monomers that can be included are any of the monomers containing hydrophobic, preferably polyalkyleneoxy hydrophobic, groups as described in EP No. 0172723. Suitable amounts are generally 0.1 to 5 mole percent. Polyacrylamide has very good water-absorption characteristics and can be used. Cationic polymers are found to have good absorption characteristics for the effluent produced in a silo, which tends to be relatively acidic. One type of polymer preferred for use in the invention comprises 5 to 100 mole % dimethyl aminoethyl acrylate quaternised with dimethyl sulphate or methyl chloride, 0 to 95 mole % acrylamide and 0 to 50 mole % other monoethylenically unsaturated monomer and a cross-linking reagent. A suitable example of such a polymer comprises 10 to 50 mole % of the cationic monomer and 90 to 50 mole % of acrylamide.

Preferred anionic polymers for use in the invention are formed of 5 to 100 mole percent acrylic acid as free acid or water soluble salt, 0 to 95 mole percent acrylamide and 0 to 50 mole percent other monoethylenically unsaturated monomer, and cross linking agent. One preferred type of copolymer is formed of 10 to 50 mole percent acrylic acid and 50 to 90 mole percent acrylamide whilst another preferred type is formed of 80 to 100 mole percent acrylic acid and 0 to 20 mole percent acrylamide, preferably being a homopolymer of acrylic acid.

The polymer particles must be cross linked throughout and so cross linking agent is preferably included in the monomer or monomer blend that is polymerised to form the particles. The amount of cross linking agent is generally from 10 to 10,000 ppm by weight total monomers. Usually it is at least 50 and often at least 100 ppm. It is generally unnecessary for it to be above 1,000 ppm and typical amounts are 200 to 500 ppm. These amounts are the amounts by weight of methylene bis acrylamide and equivalent amounts of other cross linking agents may be used. The cross linking agent may be any of the known ionic (e.g., polyvalent metal) or covalent cross linking agents suitable for copolymerizing acrylic monomers. Preferably it comprises any of the di- or polyethylenically unsaturated monomers suitable for such cross linking reactions.

Sometimes good results are achieved when the particles have a surface layer that is less swellable than the inner parts of the particles. This may be achieved by known processes; for example the desired reduced swellability of the surface layer may be obtained by cross linking the surface layer covalently or ironically.

The polymer particles used in the invention are conveniently made by bulk gel polymerisation followed by drying and comminution in conventional manner, optionally with surface cross linking as described above, but when free flowing characteristics of the polymer particles are important it is preferred for the particles to have been made by bead polymerization. Thus an aqueous solution of the monomers is dispersed in a non-aqueous liquid to form monomer beads of the desired size, polymerisation occurs within these beads and the resultant suspension is then dehydrated and the beads separated from the non-aqueous liquid. The polymerization should be conducted with control of initiator levels and temperature in order to avoid unwanted linear or low molecular weight polymer formation. The components of the bead polymerisation, e.g. the non-aqueous continuous phase and any stabilizers or surfactants, should be selected with attention to their toxicological characteristics and/or the bead product should be recovered free of such components. If desired the beads may be further comminuted.

The particles will generally have a dry particle size ranging from 10 microns to 3 mm, generally below 2 mm, but are preferably below 800 microns in size in order that a high surface of absorbent is exposed. Best results are generally achieved with products having a particle size of below 500 microns. The particles are preferably above 70 microns so as to avoid dusting problems.

Although it is preferred to minimise the amount of residual monomer unpolymerised in the polymerisation reaction from the final product, we have found that excess monomer is generally broken down during the silage-making process to render it non-toxic. For example acrylamide may be hydrolysed within the silo to ammonium acrylate. The hydrolysis of excess free acrylamide monomer in the silo or before addition to the silo may be accelerated by known chemical or biochemical/amino-biochemical means, e.g. using amidase enzyme or enzyme source, which can convert free acrylamide to ammomium acrylate.

Preferably the monomers and amount of cross-linking agent from which the polymer is made and its method of production are such that the particles absorb silage effluent (that is the effluent which drains from a silo in the absence of a water absorbent) in an amount of at least 10 times the weight of the polymer. Thus one gramme of polymer particles preferably absorb at least 20 g of silage effluent, preferably at least 40 g and often more than 50 g effluent. The amount of distilled water that the polymer absorbs it at least 200 g per g., preferably at least 400 g per g. and most preferably at least 500 g per g.

The amount of polymer that should be added depends on the nature of the materials that are used to make the silage and, in particular, on its moisture content. The polymer may be added in an amount which will entirely prevent liquid effluent draining from the silo or in an amount to reduce the amount of liquid lost, e.g. to less than half of the amount that would be lost in the absence of polymer. The polymer is generally added to the silo in an amount in the range 0.005 to 1.0% polymer based on the total amount of silage making matter, preferably in the range 0.01 to 0.5% more preferably in the range of 0.02 to 0.1% or 0.05%.

Incorporating large amounts of polymer into the silage may be undesirable, since ingestion by animals of large quantities of polymer which is apparently indigestible may supress the appetite and reduce the total intake of nutritive food by the animals. Preferably the polymer is added in the silage in an amount less than 0.1% by weight for sheep consuming 6 to 10 kg of silage per day this will represent a maximum polymer intake of 6–10 g per day and for a cow consuming 40 to 60 kg of silage per day this will represent a maximum polymer intake of 40 to 60 g per day.

The silage making process may be conventional apart from the addition of the polymer and thus may involve the use of conventional additives. For instance methods of reducing butyric acid production, as described above, may be combined with the method of the invention. Thus the pH could be lowered to encourage the growth of any lactic acid producing present in the silage, or the silage could be sterilised by known methods. A suitable method would include inoculating the silage with lactic acid producing bacteria, Lactobacter.

The polymers used in the invention are often stable, i.e. undegradable, within the gumen of cattle or digestive system of other animals to which the silage is fed, and this passes through the animal substantially in its original, swollen form. This does not seem to have any disadvantageous effect on the animals.

The following examples illustrate the invention:

EXAMPLE 1

A cross-linked polymer formed from a monomer mixture comprising 70% acrylamide and 30% acrylic acid having particles sizes in the range 75 to 710 microns was added to a silo in an amount of 0.025 polymer by weight of total matter added to the silo. The silage making process continued and the final product was fed to dairy cows.

It was observed that the amount of effluent lost from the silo was reduced or eliminated by including the polymer. The cows feeding on the treated silage did not appear to be adversely affected by the incorporation of the polymer and blood tests did not reveal any harmful components derived from the polymer particles.

Examples 2 to 4 simulate the production of silage in laboratory tests.

EXAMPLE 2

Fresh grass treated with various cross-linked polyacrylamides was packed into grass tubes sealed at both ends with a rubber bung. The bottom of the tube was fitted with a glass rod from which effluent could flow.

Each silo held 100 g grass of an initial Dry Matter Content 11.9% w/w.

The tubes were opened after about 4 months and the dry matter content of each grass sample was calculated.

| Ratio - Acrylamide:acrylic acid | Dose (%) | Dry Matter (% w/w) |
| --- | --- | --- |
| Control | 0 | 15.6 |
| 10:90 | 0.1 | 13.4 |
| 10:90 | 0:2 | 12.3 |
| 50:50 | 0.1 | 14.4 |
| 50:50 | 0.2 | 13.7 |
| 90:10 | 0.1 | 12.9 |
| 90:10 | 0.2 | 14.2 |

Thus all treatments helped retain effluent in the silage, giving a lower dry matter content than the control.

EXAMPLE 3

Fresh grass (600 g) treated with various cross-linked polyacrylamides were packed into plastic containers fitted with fermentation locks and outlet pipes for effluent. The effluent from each treatment was monitored for a period of 4 months.

| (Initial dry matter content of grass 15.1% w/w). | | |
| --- | --- | --- |
| Ratio - Acrylamide:acrylic acid | Dose (%) | Effluent (% w/w) |
| Control | 0 | 57 |
| 100:0 | 0.1 | 39 |
| 100:0 | 0.2 | 26 |
| 60:40 | 0:1 | 26 |
| 60:40 | 0.2 | 22 |
| 10:90 | 0.1 | 49 |
| 10:90 | 0.2 | 30 |

EXAMPLE 4

A sample of silage effluent, pH 3.0, was obtained. The swelling capacity of various polymers in the effluent was determined:

| Cross-linked polymer | Absorption (g effluent/g dry polymer) |
| --- | --- |
| Neutral polyacrylamide gel | 18 |
| Anionic polyacrylamide gel | 22 |
| Polyacrylate gel | 21 |
| Catonic polyacrylamide bed | 60 |

EXAMPLE 5

A polymer formed from 40 weight % acrylic acid and 60 weight % acrylamide in the presence of 200 ppm methylene bisacrylamide by gel polymerisation and having dry particle sizes in the range 75 to 710 microns was used on three forms in the summer and the following is a summary of those field trials.

(a) Grass harvested at approximately 215 dry matter, there was roughly 100 tonnes ensiled and the polymer was applied by hand at the pit, a rate of approximately 300 grammes of product per tonne of grass (0.03%). (No other additive was used).

The resulting silage had an analysis of approximately 24% DM and good fermentation characteristics. There was no noticable flow of effluent from the clamp.

The silage was fed to dairy cows in the early spring of the following year with no detrimental effect to their health, production or apparent appetite and willingness to eat the material.

(b) Approximately 90 tonnes of grass was ensiled at 21.3% dry matter and treated with an additive containing formalin and formic acid to sterilise the grass. The polymer was added at a rate of 300 grammes/tonne of grass (0.035).

There was no noticable flow of effluent from the clamp. The silage was fed to dairy cows without rejection and there appeared to be no effect on health or performance. Fermentation was good.

(c) Approximately 350 tonnes of silage was treated with sterilising additives containing sulphuric and formic acid and formalin and with polymer which was used at a rate of approximately 125 grammes/tonne of grass.

The result silage had dry matter content of 21.0% was well fermented and when fed to dairy cows proved palatable and has no effect on performance or health.

It was estimated that effluent flow was approximately half that which might have been expected in the absence of polymer.

EXAMPLE 6

Dry polymer particles of the type used in example 5 were used in the presence of a lactic-acid producing bacterial inoculant. A control clamp containing no polymer was set up as well as the trial clamp, both containing approximately 90 tonnes of silage-making composition. The clamps were sealed and provision made for effluent collection. The grass harvested had a DM of 23% and the additive mixture was applied to 0.3 kg dry polymer/tonne of grass (0.3% polymer).

The flow of effluent from the trial clamp was roughly half that of the control When fed to dairy cows they preferred the trial material to the control and appeared to eat more. There was a good fermentation and the cows fed on the trial material suffered no ill-effects.

EXAMPLE 7

Tests were carried out to investigate the degradability of the polymer used in Example 5 in the rumen of dairy cows by incubating a Dacron bag containing a sample of the polymer in the rumen. The dry weight of the polymer in the bag was measured 24 hours and 48 hours after insertion into the rumen. The weight was found to increase by 12 and 15% respectively after those periods. This increase was probably due to contamination of the polymer by microbes from the rumen, since the increase weight could not be reduced by washing the polymer in water. The results indicate that the rumen-degradability is low or zero.

EXAMPLE 8

Tests were carried out to investigate the effect on sheep of including the polymer as used in Example 5 in their silage feedstuff. The results show that the polymer does not seem to form a lump of gel in the stomach and does not have any obvious adverse effects on the health of sheep fed on the mixture for several weeks. When the sheep were fed polymer in amounts of 50 g dry polymer per day. The polymer did not have adverse effects on the digestibility of the silage constituents.

EXAMPLE 9

A polymer was formed by polymerising an aqueous monomer solution of 40% by weight dimethylaminoethyl acrylate quaternised with methylchloride and 60% by weight acrylamide in the presence of 100 ppm methylenebisacrylamide (cross-linker) by reverse phase bead polymerisation. The dry beads were recovered, they had diameters in the range 90 to 500 microns, and were found to absorb about 50 g silage effluent per g. polymer.

The polymer was used in tests on a simulated silage fermentation experiment using barley grass, the green shoot material harvested after a period of growth in a hydroponic growth chamber. This material has a lower dry matter content (8.5%) then the usual material used to make silage. Different amounts of polymer were added with 6 kg barley grass in a silo and the material weighted with a 6 kg weight. The cumulative amount of effluent lost was measured at intervals over a 21 day period was compared to a control having no polymer. The results are shown in the table below which gives the cumulative loss of liquid effluent over 21 days.

| Dose rate of cationic polymer % by weight/dry polymer on total material weight | Effluent loss g |
| --- | --- |
| 0 | 2558 |
| 0.5 | 1002 |
| 0.75 | 872 |

We claim:

1. A method for retaining silage effluent in silage comprising adding water-absorbent substantially dry, water insoluble, water-swellable particles comprising wholly synthetic polymer formed from water-soluble ethylenically unsaturated monomer or monomers including acrylic monomer, the polymer being ionic and cross-linked and able to absorb silage effluent in an amount of at least 10 times its own weight, the particle shaving sizes in the range of 10 microns to 3 mm and being added to silage-making matter in an amount in the range of 0.005 to 0.5% by weight dry polymer based on the total weight of silage-making matter.

2. The method of claim 1 wherein said polymer is selected from the group consisting of cationic polymers and anionic polymers.

3. The method of claim 1 wherein said polymer is formed from:
   (a) 5-100 mole % monomers selected from dialkylaminoaklyl -(meth)acrylates and -(meth)acrylamides and their salts and quaternary derivatives dialkyldiallyl ammonium compounds,
   (b) 0-95 mole % acrylamide,
   (c) 0-50 mole % other monoethylenically unsaturated monomer and
   (d) a cross-linking reagent.

4. The method of claim 1 wherein said polymer is capable of absorbing at least 20 g silage effluent per g dry polymer.

5. The method of claim 4 wherein said polymer is capable of absorbing at least 40 g silage effluent per g dry polymer.

6. The method of claim 1 wherein said polymer particles have dry sizes in the range of 10 to 800 microns.

7. The method of claim 1 wherein said polymer is added in an amount in the range of 0.01 to 0.1% by weight dry polymer based on the total weight of silage-making matter.

8. The method of claim 1 wherein said silage-making matter is also treated with additives to inhibit the production of butyric acid, said additives selected from the group consisting of sterilizing additives and acidic compounds.

9. The method of claim 1 further comprising the treatment of said silage-making matter with an inoculant of lactic acid-producing bacteria.

10. The method of claim 9 wherein said lactic acid-producing bacteria is lactobacter.

11. The method of claim 1 wherein said polymer is formed from:
(a) 5–100 mole % monomers selected from ethylenically unsaturated carboxylic and sulphonic acid and their salts,
(b) 0–95 mole % acrylamide,
(c) 0–50 mole % other monoethylenically unsaturated monomer, and
(d) a cross-linking reagent.

12. A product comprising a mixture of silage and particles of water-insoluble wholly synthetic polymer swollen with silage effluent, in which the polymer is formed from ethylenically unsaturated water-soluble monomer or monomers including acrylic monomer and is ionic and cross-linked, said particles, when dry, having sizes in the range of 10 microns to 3 mm and being swollen by the said effluent in an amount of at least 10 times the weight of polymer and in which the polymer is present in the product in an amount in the range of 0.005 to 0.5% by weight dry polymer based on the total weight of the silage.

13. The product of claim 12 wherein said polymer is selected from the group consisting of cationic polymers and anionic polymers.

14. The product of claim 12 wherein said polymer is formed from:
(a) 5–100 mole % monomers selected from dialkyl- aminoalkyl -(meth)acrylates and -(meth)acrylamides and their salts and quaternary derivatives dialkyldiallyl ammonium compounds,
(b) 0–95 mole % acrylamide,
(c) 0–50 mole % other monoethylenically unsaturated monomer and
(d) a cross-linking reagent.

15. The product of claim 12 wherein said polymer is capable of absorbing at least 20 g silage effluent per g dry polymer.

16. The product of claim 15 wherein said polymer is capable of absorbing at least 40 g silage effluent per g dry polymer.

17. The product of claim 12 wherein said polymer particles have dry sizes in the range of 10 to 800 microns.

18. The product of claim 12 wherein said polymer is added in an amount in the range of 0.01 to 0.5% by weight dry polymer based on the total weight of silage-making matter.

19. The products of claim 12 further comprising a lactic acid-producing bacteria.

20. The product of claim 19 wherein said lactic acid-producing bacteria is lactobacter.

21. The product of claim 12 wherein said polymer is formed from:
(a) 5–100 mole % monomers selected from ethylenically unsaturated carboxylic and sulphonic acid and their salts,
(b) 0–95 mole % acrylamide,
(c) 0–50 mole % other monoethylenically unsaturated monomer, and
(d) a cross-linking reagent.

22. A product comprising a mixture of silage and particles of water-insoluble wholly synthetic polymer swollen with silage effluent, in which the polymer is formed from water-soluble ethylenically unsaturated monomer or monomers including acrylic monomer and is ionic and cross-linked, the particles having sizes in the range of 10 microns to 3 mm, when dry, and being swollen by silage effluent in an amount of at least 10 times the weight of polymer, and in which the polymer is present in the product in an amount in the range of 0.005 to 0.5% by weight of total silage weight and in which the polymer has been used as an absorbent in the preparation of the silage.

23. the product of claim 22 wherein said polymer is selected from the group consisting of cationic polymers and anionic polymers.

24. The product of claim 22 wherein said polymer is formed from:
(a) 5–100 mole % monomers selected from dialkyl- aminoalkyl -(meth)acrylates and -(meth)acrylamides and their salts and quaternary derivatives dialkyldiallyl ammonium compounds,
(b) 0–95 mole % acrylamide,
(c) 0–50 mole % other monoethylenically unsaturated monomer, and
(d) a cross-linking reagent.

25. The product of claim 22 wherein said polymer is capable of absorbing at least 20 g silage effluent per g dry polymer.

26. The product of claim 25 wherein said polymer is capable of absorbing at least 40 g silage effluent per g dry polymer.

27. The product of claim 22 wherein said polymer particles have dry sizes in the range of 10 to 800 microns.

28. The product of claim 22 wherein said polymer is added in an amount in the range of 0.01 to 0.5% by weight dry polymer based on the total weight of silage-making matter.

29. The product of claim 22 further comprising a lactic acid-producing bacteria.

30. The product of claim 29 wherein said lactic acid-producing bacteria is lactobacter.

31. The product of claim 22 wherein said polymer is formed from:
(a) 5–100 mole % monomers selected from ethylenically unsaturated carboxylic and sulphonic acid and their salts,
(b) 0–95 mole % acrylamide,
(c) 0–50 mole % other monoethylenically unsaturated monomer, and
(d) a cross-linking reagent.

32. A method of feeding an animal in which the animal is fed a product comprising a mixture of silage and particles of water-insoluble wholly synthetic polymer swollen with silage effluent, in which the polymer is formed from ethylenically unsaturated water-soluble monomer or monomers including acrylic monomer and is ionic and cross-linked, said particles, when dry, having sizes in the range of 10 microns to 3 mm and being swollen by the said effluent in an amount of at least 10 times the weight of polymer and in which the polymer is present in the product in an amount in the range of 0.005 to 0.5% by weight dry polymer based on the total weight of the silage.

33. The method of claim 32 wherein said product is fed to a cow in an amount in the range of about 40 kg to 60 kg of product per day.

34. A method of feeding an animal in which the animal is fed a product comprising a mixture of silage and particles of water-insoluble wholly synthetic polymer swollen with silage effluent, in which the polymer is formed from water-soluble ethylenically unsaturated monomer or monomers including acrylic monomer and is ionic and cross-linked, the particles having sizes in the range of 10 microns to 3 mm, when dry, and being swollen by silage effluent in an amount of at least 10 times the weight of polymer, and in which the polymer is present in the product in an amount in the range of 0.005 to 0.5% by weight of total silage weight and in which the polymer has been used as an absorbent in he preparation of the silage.

35. The method of claim 34 wherein said product is fed to a cow in an amount in the range of about 40 kg to 60 kg of product per day.

* * * * *